United States Patent
Watanabe (10) Patent No.: US 7,970,997 B2
(45) Date of Patent: Jun. 28, 2011

(54) PROGRAM SECTION LAYOUT METHOD AND LAYOUT PROGRAM

(75) Inventor: Manabu Watanabe, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 135 days.

(21) Appl. No.: 11/019,195

(22) Filed: Dec. 23, 2004

(65) Prior Publication Data

US 2006/0053416 A1 Mar. 9, 2006

(30) Foreign Application Priority Data

Sep. 9, 2004 (JP) ................................. 2004-262490

(51) Int. Cl.
*G06F 12/00* (2006.01)
*G06F 13/00* (2006.01)
*G06F 13/28* (2006.01)
*G06F 9/45* (2006.01)

(52) U.S. Cl. ........ 711/118; 711/129; 711/133; 711/136; 711/173; 711/E12.046; 711/E12.072; 717/151

(58) Field of Classification Search .................. 717/151; 711/118, 129, 136, 173, E12.046, E12.072

See application file for complete search history.

(56) References Cited

U.S. PATENT DOCUMENTS

| 6,678,886 B2 * | 1/2004 | Kumon .......................... 717/151 |
| 2004/0098541 A1 * | 5/2004 | Megiddo et al. .............. 711/129 |

OTHER PUBLICATIONS

Keisuke Hashimoto, et al., "Basic-Block-Level Code Placement to Reduce Instruction Cache Misses", Joint Symposium on Parallel Processing JSPP'99, Information Processing Society of Japan, Jun. 9, 1999, vol. 99, No. 6, pp. 31-28.
Japanese Office Action issued on Apr. 14, 2009 in corresponding Japanese Patent Application 2004-262490.
Patent Abstracts of Japan, Publication No. 2000-056983, Published Feb. 25, 2000.
Patent Abstracts of Japan, Publication No. 2000-267861, Published Sep. 29, 2000.
Patent Abstracts of Japan, Publication No. 2001-216140, Published Aug. 10, 2001.

\* cited by examiner

*Primary Examiner* — Shane M Thomas
*Assistant Examiner* — Michael Alsip
(74) *Attorney, Agent, or Firm* — Staas & Halsey LLP (57) ABSTRACT

A program section layout method capable of improving space efficiency of a cache memory. A grouping unit groups program sections into section groups so that the total size of the program sections composing each section group does not exceed cache memory size. A layout optimization unit optimizes the layout of section group storage regions by combining each section group and a program section that does not belong to any section groups or by combining section groups while keeping the ordering relations of the program sections composing each section group.

8 Claims, 10 Drawing Sheets

| SECTION NAME | OCCUPATION RATE | THE NUMBER OF ACCESS TIMES |
|---|---|---|
| a | 0.1% | 1 |
| b | 2% | 15 |
| c | 80% | 10000 |
| d | 10% | 300 |
| e | 8% | 10 |
| f | 0% | 0 |

PROGRAM SECTION LAYOUT METHOD AND LAYOUT PROGRAM

CROSS-REFERENCE TO RELATED APPLICATIONS

This application is based upon and claims the benefits of priority from the prior Japanese Patent Application No. 2004-262490, filed on Sep. 9, 2004, the entire contents of which are incorporated herein by reference.

BACKGROUND OF THE INVENTION (1) Field of the Invention

This invention relates to a program section layout method and a layout program and, more particularly, to a program section layout method and a layout program for a computer which runs a program while storing program sections in a cache memory.

(2) Description of the Related Art

In program execution environment using a cache memory, there has been demanded a method for storing program sections in such an arrangement as to improve space efficiency of the cache memory.

Generally, because of installation cost, a small-sized cache memory is installed as compared with a memory which stores all programs. Therefore, the program storage memory is divided by cache memory size, the cache memory is associated with the divided regions of the program storage memory, and program sections are stored in the divided regions with a prescribed algorithm. When an address is accessed for the first time, the program section of the address is copied in a corresponding region of the cache memory. Then, when the same address is accessed again, the cache memory is directly accessed. This technique realizes higher performance. When a cache miss happens because a program section to be accessed does not exist in the cache memory, the program section is copied from the program storage memory. The algorithm is designed so as to reduce cache misses.

Program sections are copied from the program storage memory into the cache memory on a prescribed size basis. Regions obtained by dividing the cache memory by this size are called cache lines. One of program sections associated with the same cache line is copied and stored in the cache memory. If different program sections associated with the same cache line are frequently accessed, the cache line is overwritten accordingly. This is called cache conflict. Many cache conflicts and cache misses slow program performance.

To solve this problem, there has been proposed a method for increasing an instruction cache hit rate in interpreter execution by dynamically changing the arrangement of an instruction cache memory on a virtual instruction basis (for example, refer to Japanese Unexamined Patent Publication No. 2000-267861, paragraphs [0023] to [0030] and FIG. 1). In addition, there has been a layout method for directly or indirectly extracting function-call patterns which possibly cause cache conflicts, and arranging programs in an order of frequently-executed functions while avoiding the patterns (for example, refer to Japanese Unexamined Patent Publication No. 2001-216140, paragraphs [0033] to [0038] and FIG. 1).

Conventional program section layout methods use various algorithms to improve space efficiency of a cache memory. These methods, however, have a drawback in which many programs should be executed to reduce cache misses, such as analyzing program structures or function call relations. This requires many kinds of algorithms and makes automation of layout of program sections difficult.

Further, when an order of program sections is determined with an algorithm, the program sections are stored in cache-size divided regions of a program storage memory in the order. A group of program sections stored in the same divided region is referred to as a section group. When a divided region for storing one section group does not have enough space to store a program section to be stored next, the program section is stored in the next divided region as a new section group. By repeating this process, the program sections belong to section groups and are stored in the program storage memory.

This technique to store program sections in divided regions in a determined order, however, has a drawback in which wasteful free regions are created because the program sections have different sizes. As a result, larger memory size is required for storing all the program sections. However, in program execution environment limiting capacity to store program sections, for example, using a read-only memory (ROM), demands for both improving space efficiency of a cache memory and decreasing the size of a region to be used for storing program sections are growing.

SUMMARY OF THE INVENTION

This invention provides a program section layout method of a computer which runs a program while storing program sections in a cache memory. With this program section layout method, a grouping unit groups program sections with the ordering rules specified by a prescribed algorithm so that the total size of program sections composing each section group created by the grouping does not exceed cache memory size, the program sections each being an executable unit of processing functions. A layout optimization unit optimizes the layout of section group storage regions of cache memory size by combining each section group and a program section which does not belong to any section groups or by combining section groups while keeping the ordering relations of the program sections composing each section group created by the grouping.

Further, there has been provided a layout program to execute a layout process for program sections in a computer which runs a program while storing program sections in a cache memory. This layout program causes the computer to execute: grouping program sections with the ordering rules specified by a prescribed algorithm so that the total size of program sections composing each section group created by the grouping does not exceed cache memory size, each program section being an executable unit of processing functions; and optimizing the layout of section group storage regions of cache memory size by combining each section group and a program section which does not belong to any section groups or by combining section groups while keeping the ordering relations of the program sections composing each section group created by the grouping.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

This invention has been made in view of foregoing and intends to propose a program section layout method and a layout program capable of improving space efficiency of a cache memory despite program properties. Further, another object of this invention is to reduce the size of a region to be used for storing program sections through a layout process.

One embodiment of this invention will be now described with reference to the accompanying drawings. The following first describes a concept of this invention which is implemented to this embodiment and then specific examples.

Figure 1:
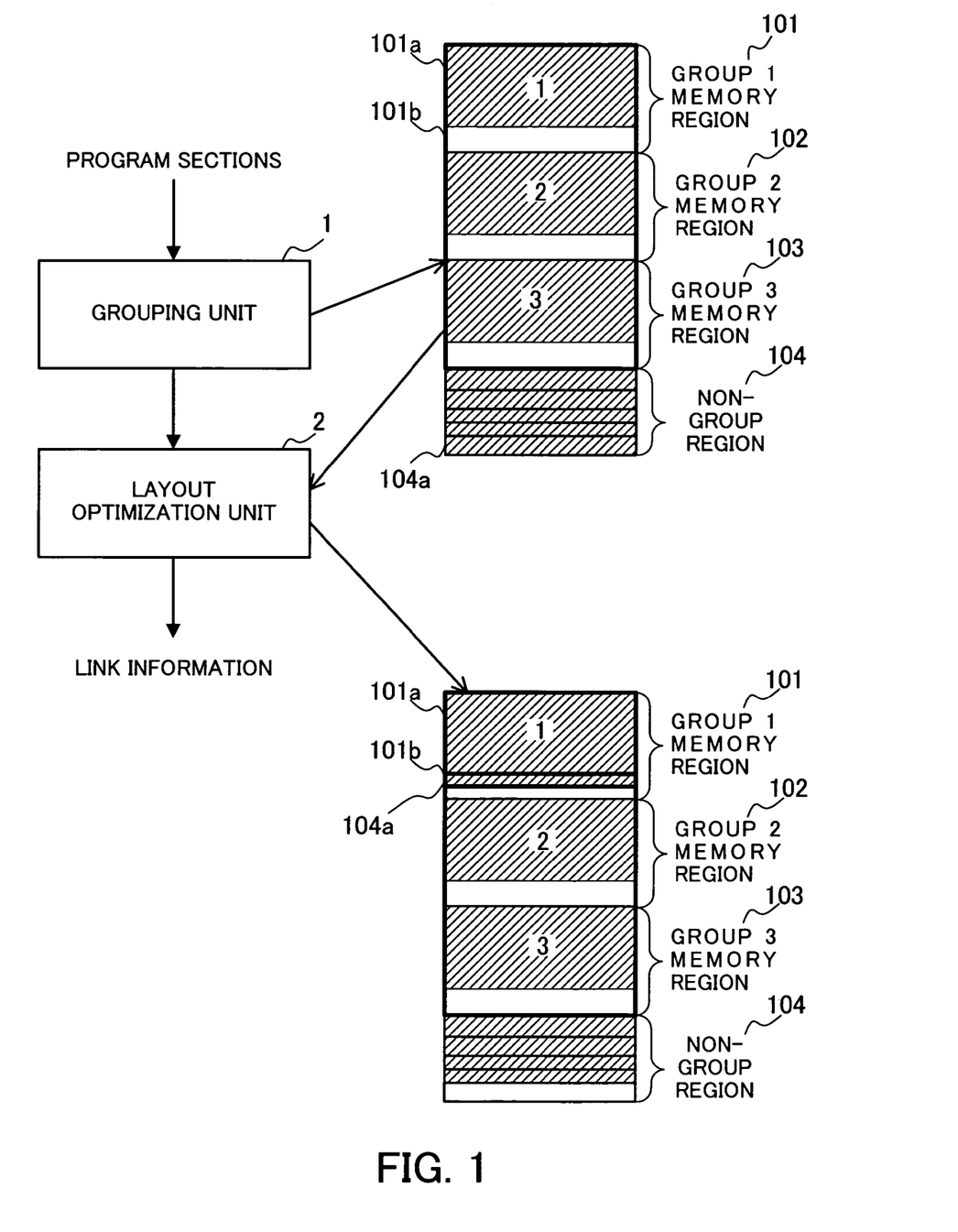
FIG. 1 is a conceptual view of this invention which is implemented to one embodiment.

A program section layout method of this invention is capable of reducing cache misses and improving space efficiency of a cache memory for application programs of a computer with the cache memory. FIG. 1 shows a concept of this invention which is applied to the embodiment.

This program section layout method of this invention is realized by a layout program which causes a computer to execute a program section layout process. This computer operates as a layout device by running this layout program.

The layout device is composed of a grouping unit 1 for grouping program sections and a layout optimization unit 2. A program section is an executable unit of processing functions, for example, a function in terms of C language. The grouping unit 1 receives objects created by compiling/assembling the source program. Program sections contain code sections and data sections, and this invention relates to the code sections.

The grouping unit 1 groups program sections with a prescribed algorithm. Each created section group is a group of program sections to be stored in the same section group storage region created by dividing a program storage region by cache memory size. In FIG. 1, a group 1 memory region 101, a group 2 memory region 102, and a group 3 memory region 103 are section group storage regions. The grouping unit 1 sequentially assigns program sections from the highest-order (or lowest-order) program section to a group 1 with the ordering rules specified by the prescribed algorithm. At this time, the program sections are assigned to the group 1 so that the total size of the program sections belonging to the group 1 does not exceed the memory size (corresponding to cache memory size) of a section group storage region. If the total size exceeds the memory size, a new section group is created. By repeating this process, the groups 1, 2, . . . are created from the program sections with the ordering rules specified by the prescribed algorithm.

After the grouping, the layout optimization unit 2 optimizes the layout of the created section groups by combining each section group and a program section which does not belong to any section groups orby combining section groups while keeping the ordering relations in the section group, and outputs optimized link information. Keeping the ordering relations in a section group means keeping the arrangement of program sections set with the ordering rules specified by a prescribed algorithm, and there are two methods: one is that the program sections remain their positions the same; and the other is that the program sections are rearranged in a reverse order. For example, by reversing the order of program sections being arranged in decreasing order of the number of access times, the program sections are arranged in increasing order of the number of access times. This also keeps the subject of the algorithm. The optimization process will be now described. For example, assume that there are section groups and program sections which do not belong to any section groups. After grouping, the group 1 memory region 101 has a region 101*a* storing program sections and a free region 101*b* which is created because a next program section cannot be stored. This optimization process determines whether a program section, which does not belong to any section groups and is stored in a non-group region 104, can be stored in this free region 101*b*. If possible, this program section is stored in the free region 101*b*. In this example, the last program section 104*a* of the non-group region 104 is stored in the free region 101*b* of the group 1 memory region 101. Alternatively, the optimization process may reverse the order of the program sections of each section group.

With the above process, the layout of the section group storage regions can be optimized while keeping the ordering relations made with an algorithm.

One embodiment will be described in detail with reference to the accompanying drawings.

Figure 2:
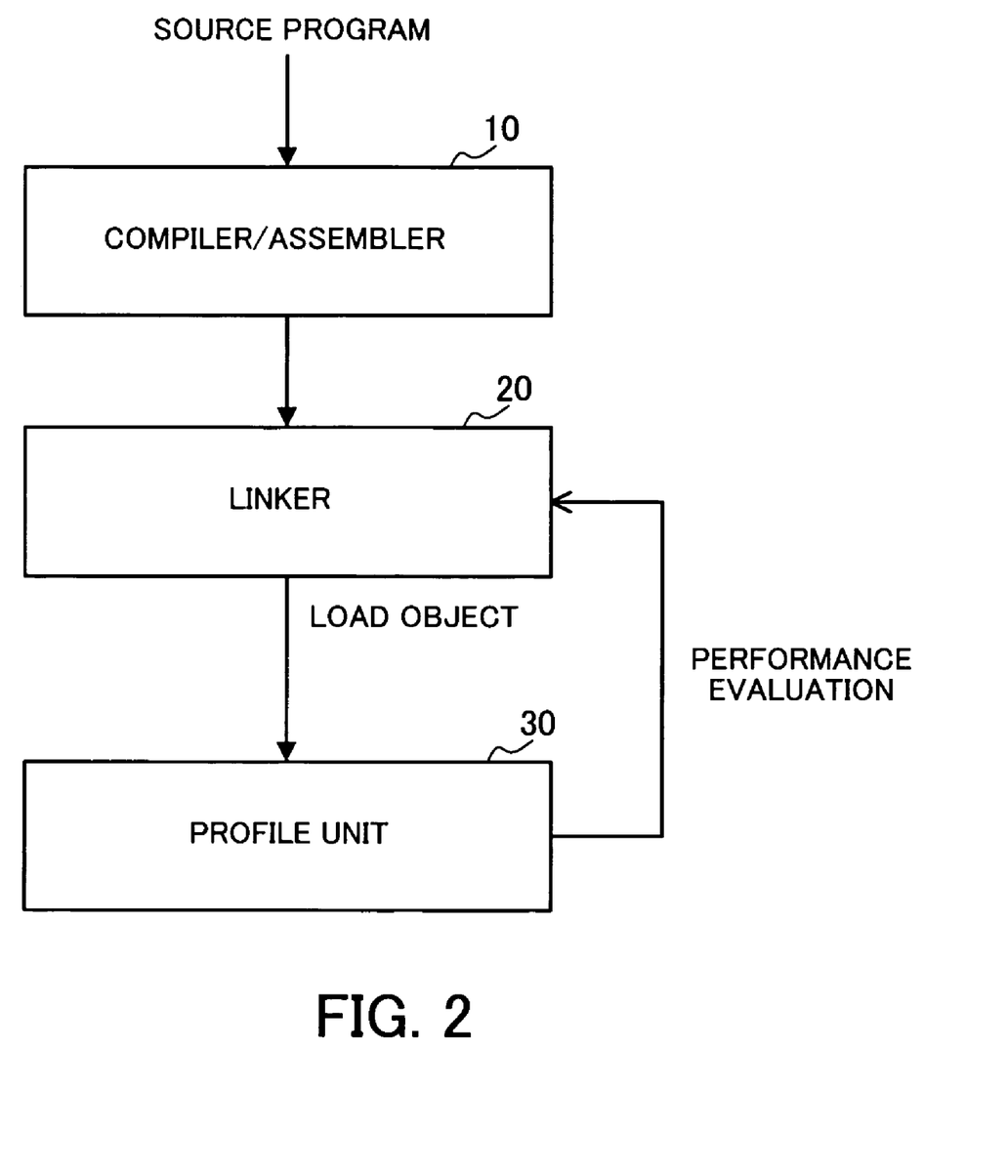
FIG. 2 shows an example of a system structure to which a program section layout method is applied.

FIG. 2 is a schematic diagram showing a system structure to which the program section layout method is applied.

When the source program is coded, a compiler/assembler of a support device which supports computer program development compiles and assembles the program to create object files. Each object file is composed of a plurality of object sections each indicating a processing function. Then a linker links the created object sections to create a computer-executable load object. The linker 20 is capable of rearranging the object sections with prescribed rules. Before the rearrangement, a profile unit 30 simulates the created load object to evaluate its performances. For example, the profile unit 30 obtains cache information, the number of calls, and occupation rate for each section. Based on the performance evaluation by the profile unit 30, the linker 20 rearranges the object sections. The support device may have one unit or plural units for performing the coding, compiling/assembling, linker, and profiling. The program section layout process of this embodiment is executed by the linker 20.

Figure 3:
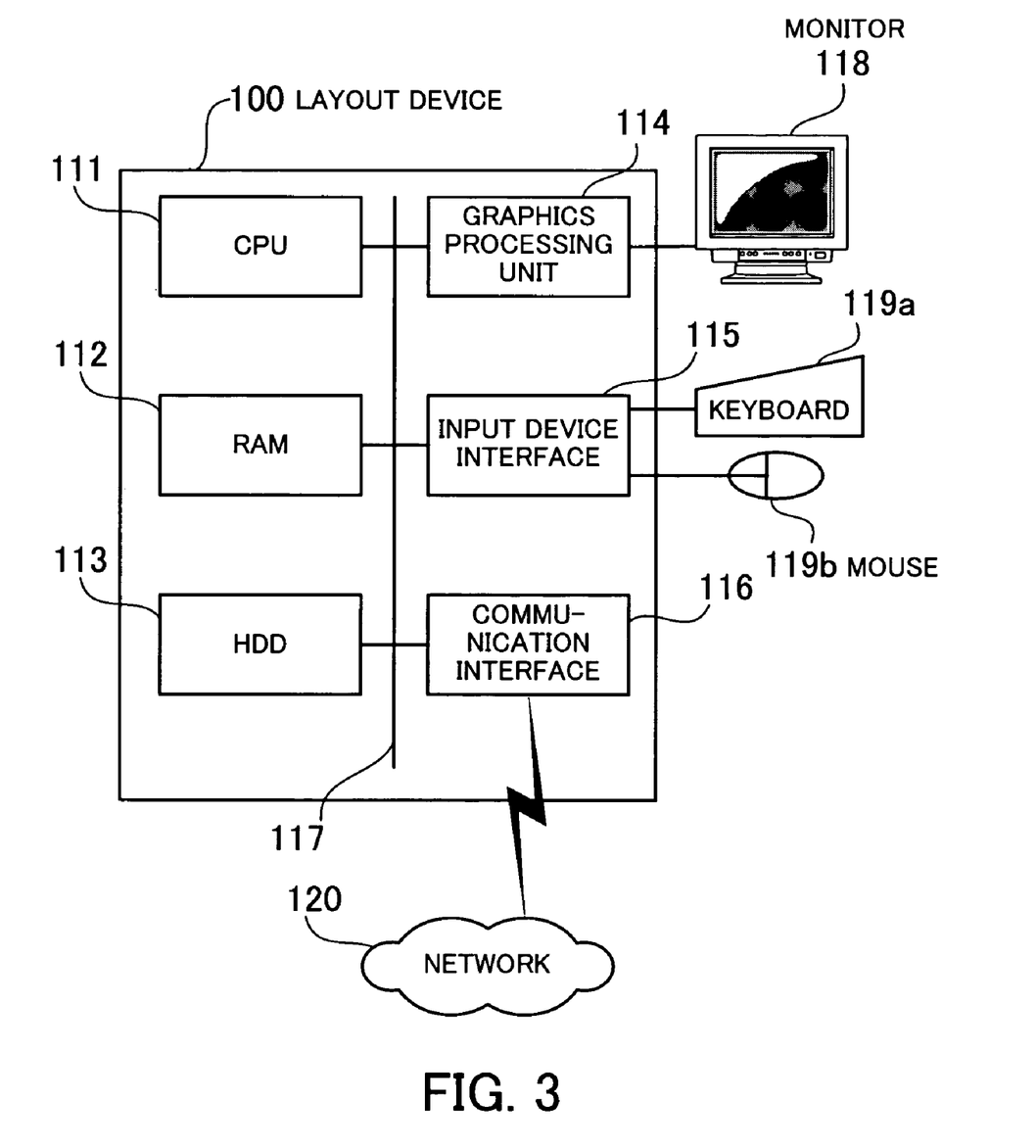
FIG. 3 shows a hardware structure of a layout device according to this embodiment.

A layout device which realizes the processing functions of the linker 20 will be described. FIG. 3 shows a hardware structure of the layout device of this embodiment.

A layout device 100 is entirely controlled by a central processing unit (CPU) 111. Connected to the CPU 111 via a bus 117 are a random access memory (RAM) 112, a hard disk drive (HDD) 113, a graphics processing unit 114, an input device interface 115, and a communication interface 116.

The RAM 112 temporarily stores at least part of an operating system (OS) program and application programs that the CPU 111 executes. Further, the RAM 112 stores various data for CPU processing. The HDD 113 stores the OS and application programs. Connected to the graphics processing unit 114 is a monitor 118 to display images on the screen of the monitor 118 under the control of the CPU 111. Connected to the input device interface 115 are a keyboard 119a and a mouse 119b to transfer signals from the keyboard 119a and the mouse 119b to the CPU 111 via the bus 117. The communication interface 116 is connected to a network 120 to communicate data with external devices over the network 120.

With the above hardware structure, the processing functions of this embodiment can be realized. The support device shown in FIG. 2 can have this hardware structure.

A layout procedure will be now described in detail. A first embodiment will be described on a case of combining a section group and a program section which does not belong to any section groups. A second embodiment will be described on a case of combining section groups. Program sections and section groups are hereinafter referred to as sections and groups simply.

First Embodiment

In this first embodiment, sections are grouped with an algorithm based on performance evaluation conducted by the profile unit 30.

Figure 4:
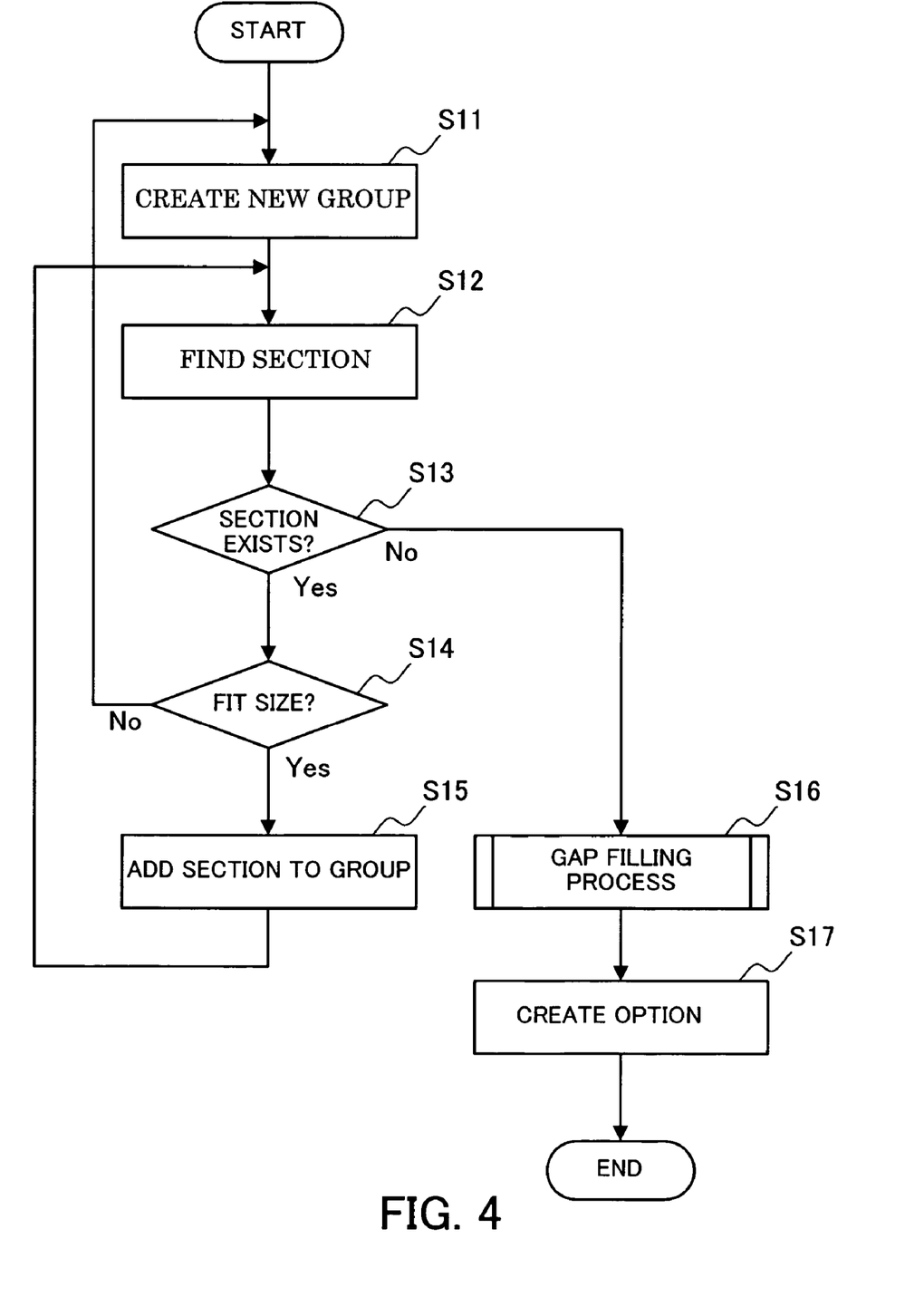
FIG. 4 is a flowchart showing a grouping procedure of the first embodiment.

FIG. 4 is a flowchart showing a grouping procedure of the first embodiment. After the profile unit 30 conducts performance evaluation, this process starts.

[Step S11] Create a new group. Groups are created in correspondence with group storage regions of cache size.

[Step S12] Find a section to be assigned next with the algorithm based on the performance evaluation.

[Step S13] Determine whether there is a next section. If there is no section, go to step S16.

[Step S14] Since there is a next section, compare the size of this section with the size of the remaining region for the group to determine whether the total size of the sections is smaller than the size of the group storage region (cache memory size). If no, return back to step S11 to create a new group.

[Step S15] Since the total size of the sections including the next section is smaller than the size of the group storage region, assign this next section to the group. Then, go to step S12 to find a next section.

[Step S16] Since there is no more section to be grouped, perform a gap filling process to fill the free spaces of group storage regions created after the grouping. This gap filling process will be described later in detail.

[Step S17] Create options if requested.

Figure 5:
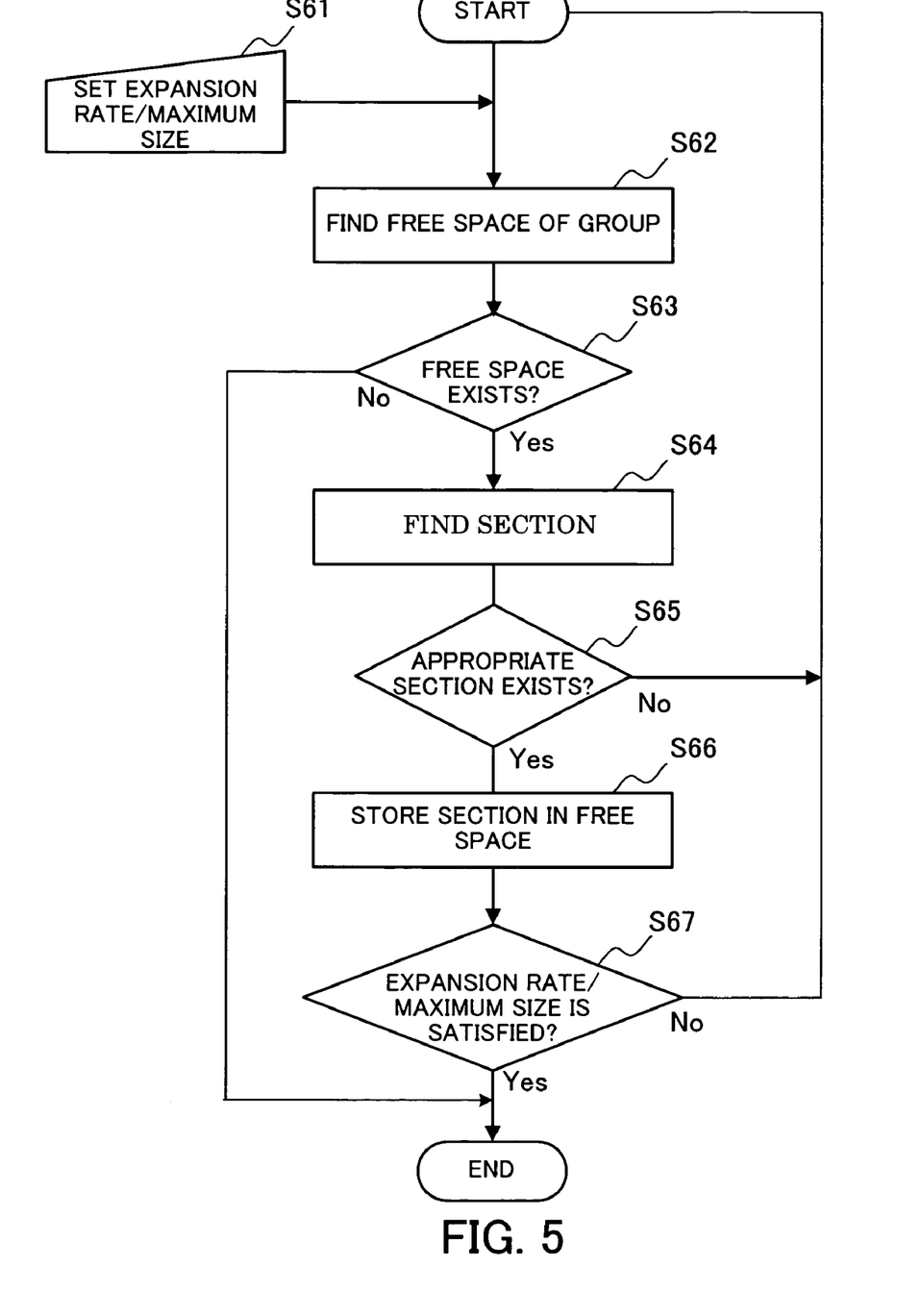
FIG. 5 is a flowchart showing a gap filling procedure of the first embodiment.

The gap filling procedure will be now described with reference to the flowchart of FIG. 5.

After the sections are grouped, this process starts. By the grouping, a plurality of groups each comprising sections and non-group sections are arranged in an order based on an algorithm. The non-group sections are sections which are determined by the algorithm as not being grouped. For example, when arrangement is done in decreasing order of the number of times of call, sections with no call are not grouped.

In addition, before this process starts, an upper-limited expansion rate or the maximum size is determined (step S61). An expansion rate is a rate of the size of a memory being used for all sections being grouped and stored in group storage regions to the total size of the all sections. Due to the free spaces of the group storage regions, the size of a memory being used for all sections becomes larger than that of the all sections. The expansion rate is set to indicate an upper-limited size of a memory which is used for all sections after optimization. Alternatively, the maximum size which is directly limited can be set.

[Step S62] Find free space in a group storage region in order from the first group.

[Step S63] Determine whether there is a group storage region with free space. If no, terminate this process.

[Step S64] Search sections from the last section to find a section that fits the free space.

[Step S65] Determine whether there is a section that fits the free space. If no, return back to step S62 to find free space of a next group with the free space untouched.

[Step S66] Since there is an appropriate section, store this section in the free space of the group storage region. As a result, the size of the memory being used for all sections is reduced by the size of this section.

[Step S67] Compare the size of the memory being used for the all sections, which has been reduced through the gap filing process at step S66, with the maximum size. Alternatively, an expansion rate of the reduced memory size to the size of the all sections can be compared with a preset expansion rate. Then it is determined whether the preset maximum size or expansion rate is satisfied after this gap filling process. If yes, terminate this process. If no, on the contrary, return back to step S62 and continue this process for a next group.

The above process for the free spaces of all groups continues until the preset expansion rate or maximum size is satisfied. By storing non-group sections in the free spaces of group storage regions, the size of a memory being used for storing all sections can be optimized while keeping the arrangement set by an algorithm. Specifically, this process is very effective in program execution environment limiting capacity to store program sections such as using a ROM.

Figure 6:
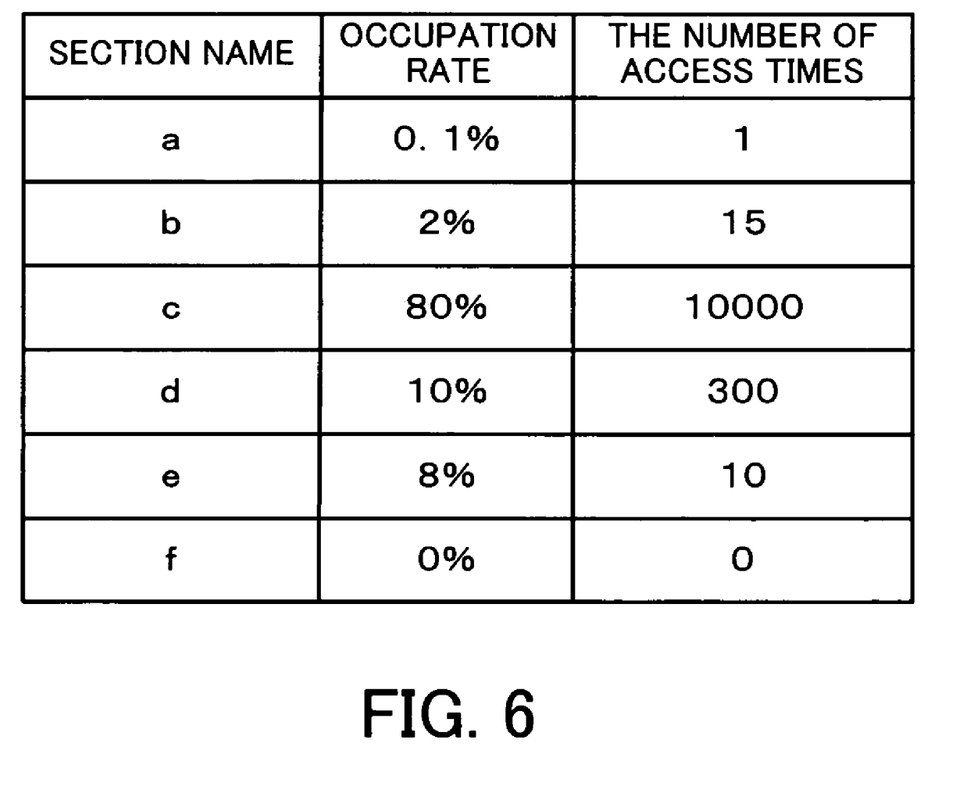
FIG. 6 shows an example of a result of performance evaluation conducted by a profile unit.

Specific operations of the first embodiment will be now described. FIG. 6 shows an example of a result of performance evaluation conducted by the profile unit.

Referring to this figure, an occupation rate and the number of access times are obtained for each of 6 sections "a", "b", "c", "d", "e", and "f". The occupation rate indicates a rate of execution of a section to execution of the entire process. For example, this rate is calculated by measuring time during which this section was executed out of time for the entire process. The number of access times is calculated by counting the number of times where other sections accessed a section within a prescribed time period. Referring to FIG. 6, the section "a" has an occupation rate of 0.1% and 1 access time. The section "b" has an occupation rate of 2% and 15 access times. The section "c" has an occupation rate of 80% and 10000 access times. The section "d" has an occupation rate of 10% and 300 access times. The section "e" has an occupation rate of 8% and 10 access times. The section "f" has an occupation rate of 0% and 0 access time.

An algorithm for grouping based on the above performance evaluation is arbitrarily determined. For example, when an algorithm specifies a decreasing order of occupation rate, the sections are arranged in an order of "c", "d", "e", "b", "a", and "f". When an algorithm specifies a decreasing order of the number of access times, the sections are arranged in an order of "c", "d", "b", "e", "a", and "f". Assume now that such an algorithm is set as to arrange sections in decreasing order of occupation rate and to determine sections having an occupation rate lower than 1% as non-group sections.

Figure 7:
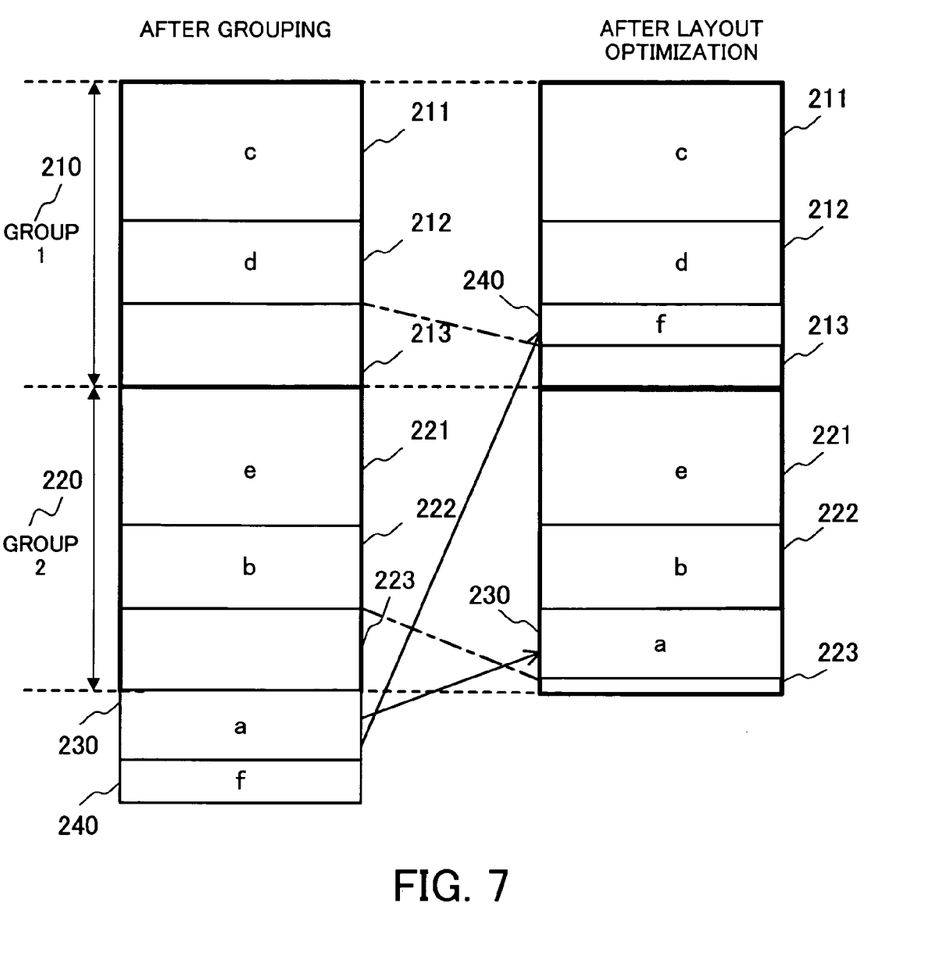
FIG. 7 shows an example of group structures obtained after grouping and after layout optimization according to the first embodiment.

Sections are arranged and grouped with this algorithm. After the grouping, the gap filling process to store non-group sections in the free spaces of groups is performed. FIG. 7 shows an example of group structures obtained after the grouping and after the layout optimization.

After the grouping, two groups, a group 1 (210) and a group 2 (220), and non-group sections "a" 230 and "f" 240 are stored in order. The group 1 (210) is composed of the section "c" 211 having the highest occupation rate and the section "d" 212 having the second highest occupation rate, resulting in creating free space 213. The group 2 (220) is composed of the section "e" 221 having the third highest occupation rate and the section "b" 222 having the fourth highest occupation rate, resulting in creating free space 223. After this grouping, the size of a memory being used for storing all the sections is calculated by group storage region size (cache memory size)× 2+the size of the section "a" 230+the size of the section "f" 240.

The layout optimization compares the size of the free space 213 of the group 1 (210) with the size of the last section "f" 240 and stores, if possible, the section "f" 240 in the free space 213. Now, assume that this section "f" 240 can be stored. As a result, the section "f" 240 is arranged next to the section "d" 212 of the group 1 (210). This reduces the size of the memory being used for storing all the sections by the size of the section "f" 240. The section "a" 230 now becomes the last section.

Then, the group 2 (220) is searched and the free space 223 is found. The size of this free space 223 of the group 2 (220) is compared with the size of the last section "a" 230, and this last section 230 is stored in the free space 223 if possible. Now assume that the section "a" 230 can be stored. As a result, the section "a" 230 is arranged next to the section "b" 222 of the group 2 (220). This further reduces the size of the memory being used for storing all the sections by the size of the section "a" 230. In this example, the size of the memory being used for storing all the sections is calculated by group storage region size (cache memory size)×2.

In this first embodiment, grouping is done with an algorithm and sections having low occupation rates are stored in the free spaces of group storage regions while keeping the ordering relations of the sections of each group as described above. This can save a memory with keeping a cache miss rate low. In addition, since optimization is done based on the arrangement set by a prescribed algorithm, even sections grouped and arranged with any algorithm can be optimized despite program properties.

Second Embodiment

This second embodiment is to perform a "reverse algorithm process" which reverses the arrangements in groups instead of the "gap filling process" of the grouping process of the first embodiment. This second embodiment performs the same grouping process as the first embodiment.

Figure 8:
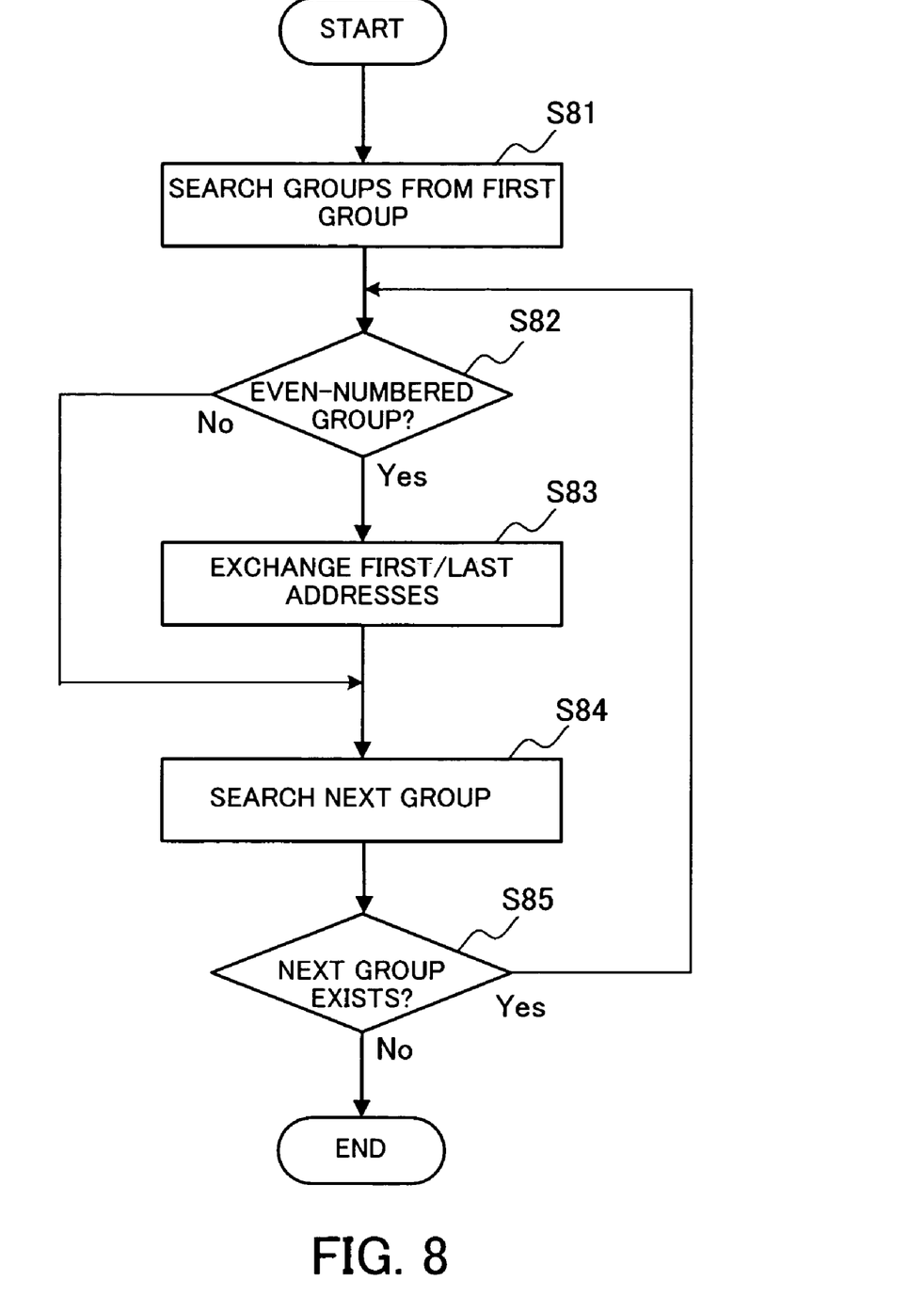
FIG. 8 is a flowchart showing a reverse algorithm procedure according to the second embodiment.

FIG. 8 is a flowchart showing the reverse algorithm procedure of the second embodiment. After grouping, the sections of each group have an arrangement set with the ordering rules specified by an algorithm. For example, the sections are arranged in decreasing order of the number of access times or in decreasing order of occupation rate.

[Step S81] Check groups from the first group. It means that this process starts from the group 1.
[Step S82] Determine whether the group is an even-numbered group. If no, go to step S84.
[Step S83] Symmetrically exchange the positions of the sections existing at the first/last addresses of the group since the group is an even-numbered group. That is, move the first section (existing at the first address) to the last address based on the algorithm. By moving sections in order, the sections are finally rearranged in a reverse order of the arrangement set by the algorithm. If the algorithm specifies a decreasing order of the number of access times, the sections are rearranged in increasing order of the number of access times. Although the arrangement set by the algorithm is reversed, the subject of the algorithm, that is, arrangement based on the number of access times remains.
[Step S84] Find a next group.
[Step S85] Determine whether there is a next group. If no, terminate this process. If yes, on the contrary, return back to step S82 to repeat this process.

With the above procedure, the sections of even-numbered groups are rearranged in a reverse order. For example, assume now that sections are arranged in decreasing order of the number of access times. The first section of each group is accessed with high possibility. This may cause cache conflicts easily. By arranging the sections of odd-numbered groups in decreasing order of the number of access times and arranging the sections of even-numbered groups in increasing order of the number of access times, the cache conflicts can be reduced.

In the above description, the arrangements of the sections of even-numbered groups are reversed. Even by reversing the arrangements of the sections of odd-numbered groups, the same effects can be obtained.

Figure 9:
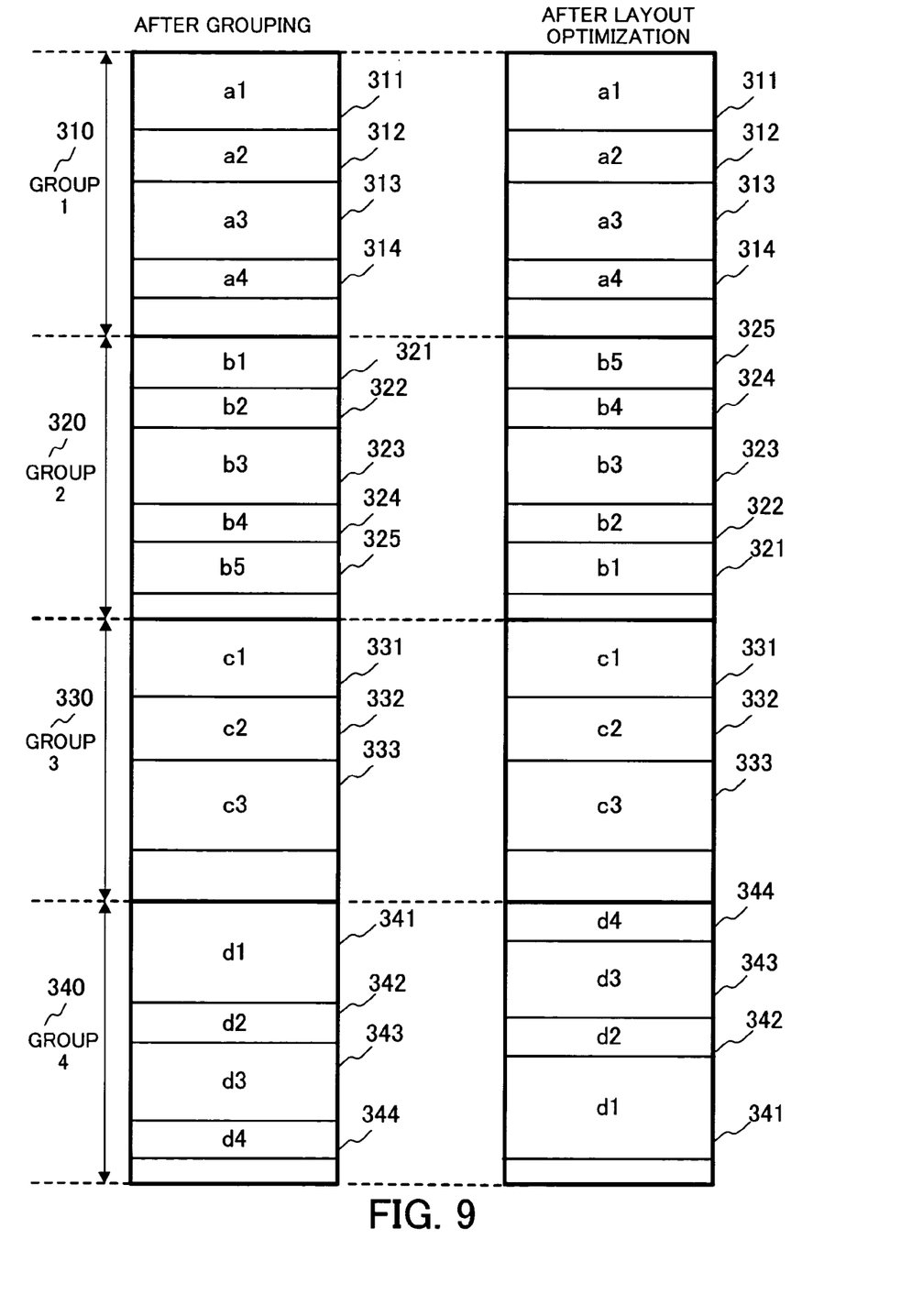
FIG. 9 shows an example of group structures obtained after grouping and after layout optimization according to the second embodiment.

A specific example will be described. FIG. 9 shows an example of group structures obtained after the grouping and after the layout optimization of the second embodiment.

After the grouping, four groups: group 1 (310); group 2 (320); group 3 (330); and group 4 (340) are created. Each group is composed of sections numbered 1, 2, 3, 4, 5 in decreasing order of the number of access times. Alternatively, a decreasing order of occupation rate can be adopted. In this figure, in the group 1 (310), a1 (311), a2 (312), a3 (313), and a4 (314) are arranged in decreasing order of the number of access times. Similarly, the group 2 (320) has an arrangement of b1 (321), b2 (322), b3 (323), b4 (324), and b5 (325). The group 3 (330) has an arrangement of c1 (331), c2 (332), c3 (333), and the group 4 (340) has an arrangement of d1 (341), d2 (342), d3 (343), and d4 (344). Since the upper parts storing sections with number "1" have a large number of access times while the lower parts have a few number of access times, the upper parts are frequently accessed. This causes cache conflicts easily.

Therefore, the layout optimization reverses the arrangements of the sections of even-numbered groups 2 (320) and 4 (340). In this example, b1 (321), b2 (322), b3 (323), b4 (324) and b5 (325) of the group 2 (320) are rearranged in an order of b5 (325), b4 (324), b3 (323), b2 (322), and b1 (321). Similarly, d1 (341), d2 (342), d3 (343) and d4 (344) of the group 4 (340) are rearranged in an order of d4 (344), d3 (343), d2 (342), and d1 (341).

Figure 10:
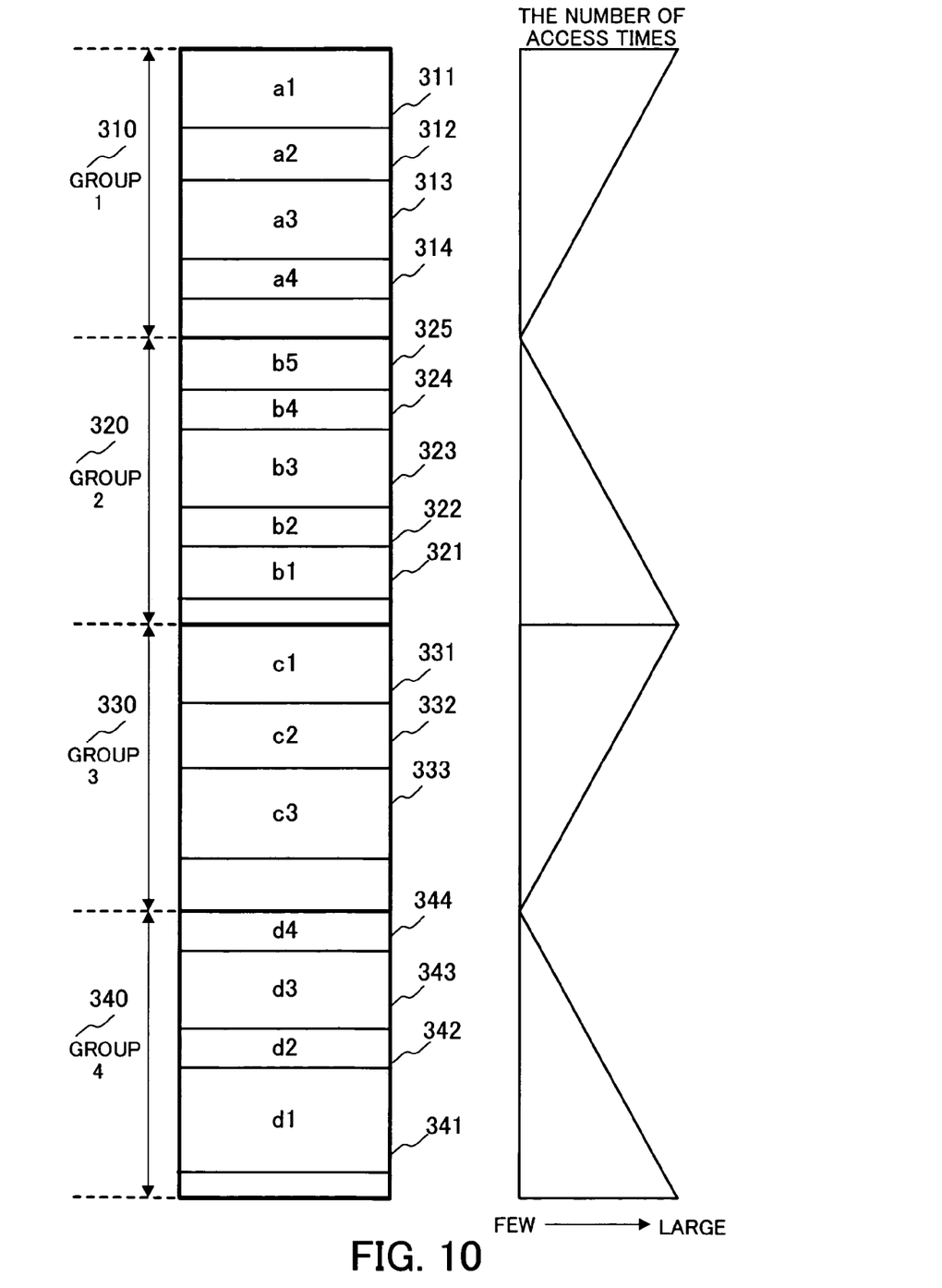
FIG. 10 shows an example of the number of access times in groups after the layout optimization according to the second embodiment.

FIG. 10 shows an example of the number of access times in the groups after the layout optimization of the second embodiment. The same reference numerals are applied parts corresponding to those of FIG. 9. The larger number of access times is to the right.

As is clear from this figure, the group 1 (310) and the group 3 (330) have the decreasing order of the number of access times. That is, the lower parts have a fewer number of access times. The group 2 (320) and the group 4 (340), on the other hand, have the increasing order of the number of access times. That is, the lower parts have a larger number of access times. By reversing the arrangements set based on the number of access times as described above, cache conflicts can be reduced.

Although the first embodiment and the second embodiment have been described separately, both embodiments keep arrangements set by an algorithm. Therefore, both layout optimization techniques can be performed. For example, after a memory size is reduced with the technique of the first embodiment, the arrangements of even- or odd-numbered groups can be reversed.

The processing functions described above can be realized by a computer. In this case, a program is prepared, which describes processes for performing the functions of the layout device. The program is executed by a computer, whereupon the aforementioned processing functions are accomplished by the computer. The program describing the required processes may be recorded on a computer-readable recording medium. Computer-readable recording media include magnetic recording devices, optical discs, magneto-optical recording media, semiconductor memories, etc. The magnetic recording devices include hard disk drives (HDD), flexible disks (FD), magnetic tapes, etc. The optical discs include digital versatile discs (DVD), DVD-Random Access Memories (DVD-RAM), compact disc read-only memories (CD-ROM), CD-R (Recordable)/RW (ReWritable), etc. The magneto-optical recording media include magneto-optical disks (MO) etc.

To distribute the program, portable recording media, such as DVDs and CD-ROMs, on which the program is recorded may be put on sale. Alternatively, the program may be stored in the storage device of a server computer and may be transferred from the server computer to other computers through a network.

A computer which is to execute the program stores in its storage device the program recorded on a portable recording medium or transferred from the server computer, for example. Then, the computer runs the program. The computer may run the program directly from the portable recording medium. Also, while receiving the program being transferred from the server computer, the computer may sequentially run this program.

With the program section layout method of this invention, program sections are grouped and arranged with the ordering rules specified by a prescribed algorithm and then the layout of the created section groups is optimized by combining each section group and a program section that does not belong to any section groups or by combining section groups while keeping the ordering relations of the program sections of the section groups. By doing this, the layout of the section group storage regions can be optimized by combining section groups or each section group and a program section while keeping the ordering relations made with an algorithm. In other words, the optimization can be done without changing the ordering relations made with the algorithm, despite the algorithm and program properties. As a result, space efficiency of a cache memory can be improved despite the program properties.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A program section layout method for storing program sections in storage regions, the program section layout method comprising:

grouping the program sections based on occupation ratio of the program sections so that a total size of program sections composing each of a plurality of section groups does not exceed a size of selection group storage regions into which a program storage region is divided by cache memory size, and arranging the program sections of each section group according to the occupation ratio, the occupation ratio indicating a ratio of previously measured execution time duration of a program section to total execution time duration;

optimizing a layout of the section group storage regions by arranging a different program section that does not belong to any of the section groups in a free space of the section group storage regions while maintaining an order of the program sections according to the occupation ratio; and reversing an order of program sections of one of the adjoining section groups, and storing the program sections in the section group storage regions, wherein, in the grouping, the program sections except for program sections having occupation ratio lower than a prescribed value are arranged in a decreasing order of the occupation ratio in the section group storage regions, and wherein the program sections are arranged in the storage regions of a cache memory corresponding to the section group storage regions storing the program sections.

2. The program section layout method according to claim 1, wherein, in a procedure to combine each of the previously grouped program sections and a different program section that does not belong to any of the previously grouped program section groups, the different program section that does not belong to any of the previously grouped program sections is rearranged in a free space of a section group storage region for a section group when a size of the program section is smaller than a size of the free space calculated by subtracting a total size of program sections composing the section group from the cache memory size of the section group storage region.

3. The program section layout method according to claim 2, wherein, rearrangement of a program section in a free space of a section group storage region is repeated until a total size of a storage region becomes smaller than a prescribed size, the storage region being used for storing the program sections and including free spaces of section group storage regions after the grouping.

4. The program section layout method according to claim 2, wherein, rearrangement of a program section in a free space of a section group storage region is repeated until an expansion rate becomes smaller than a prescribed rate, the expansion rate indicating a rate of a total size of a storage region to a total size of the program sections before the grouping, the storage region being used for storing the program sections and including free spaces of section group storage regions after the grouping.

5. The program section layout method according to claim 2, wherein, rearrangement of the different program section into a free space of a section group storage region is done in order starting with a last program section that was stored.

6. A computer-readable recording medium storing a layout program for storing program sections in storage regions to execute a layout process, the layout program comprising:

grouping the program sections based on occupation ratio of the program sections so that a total size of program sections composing each of section groups does not exceed a size of section group storage regions into which a program storage region is divided by cache memory size, and arranging the program sections of each section group according to the occupation ratio, the occupation ratio each indicating a rate of previously measured execution time duration of a program section to total execution time duration;

optimizing a layout of the section group storage regions by arranging a different program section that does not belong to any of the section groups in a free space of the section group storage regions while maintaining an order of the program sections according to the occupation ratio; and reversing an order of program sections of one of the adjoining section groups, and storing the program sections in the section group storage regions, wherein, in the grouping, the program sections except for program sections having occupation ratio lower than a prescribed value are arranged in a decreasing order of the occupation ratio in the section group storage regions, and wherein the program sections are arranged in the storage regions of a cache memory corresponding to the section group storage regions storing the program sections.

7. A program section layout method for storing program sections in storage regions, the program section layout method comprising:

grouping the program sections based on a number of access times to the respective program sections so that a total size of program sections composing each of a plurality of section groups does not exceed a size of section group storage regions into which a program storage region is divided by cache memory size, and arranging the program sections of each section group in decreasing order of the numbers of access times, or in increasing order of the numbers of the access times, the number of access times indicating how many times a program section was accessed from other program sections within a predetermined time period;

optimizing a layout of the section group storage regions by arranging a different program section that does not belong to any of the section groups in a free space of the section group storage regions while maintaining an order of the program sections according to the numbers of access times; and reversing an order of program sections of one of the adjoining section groups, and storing the program sections in the section group storage regions, and wherein, in the grouping, the program sections except for program sections having number of access times lower than a prescribed value are grouped, and wherein the program sections are arranged in the storage regions of a cache memory corresponding to the section group storage regions storing the program sections.

8. A computer-readable recording medium storing a layout program for storing program sections in storage regions to execute a layout process, the layout program comprising:

grouping the program sections based on a number of access times to the respective program sections so that a total size of program sections composing each of section groups does not exceed a size of section group storage regions into which a program storage region is divided by cache memory size, and arranging the program sections of each section group in decreasing order of the numbers of access times, or in increasing order of the numbers of the access times, the number of access times indicating how many times a program section was accessed from other program sections within a predetermined time period;

optimizing a layout of the section group storage regions by arranging a different program section that does not belong to any of the section groups in a free space of the section group storage regions while maintaining an order of the program sections according to the numbers of access times; and reversing an order of program sections of one of the adjoining section groups, and storing the program sections in the section group storage regions, and wherein, in the grouping, the program sections except for program sections having number of access times lower than a prescribed value are grouped, and wherein the program sections are arranged in the storage regions of a cache memory corresponding to the section group storage regions storing the program sections.

* * * * *